Jan. 29, 1963  R. E. WILLIAMS  3,076,191
RADAR SYSTEM
Filed March 29, 1955
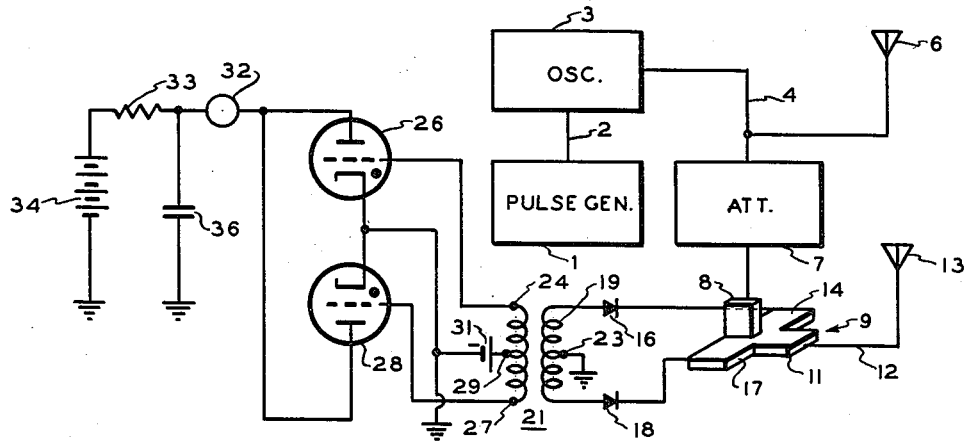
Fig.1
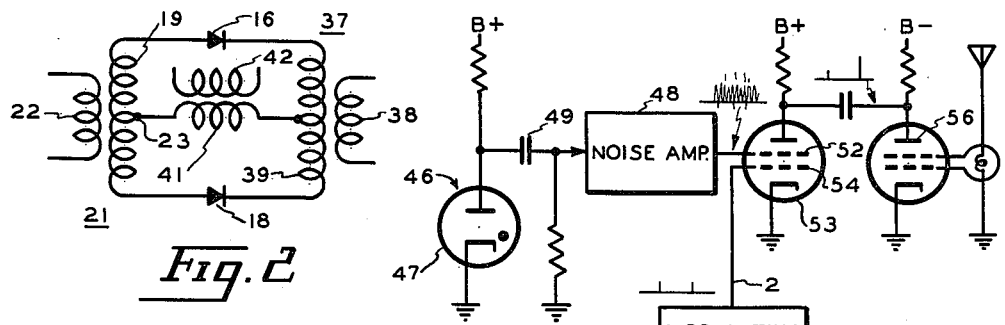
Fig.2
Fig.3
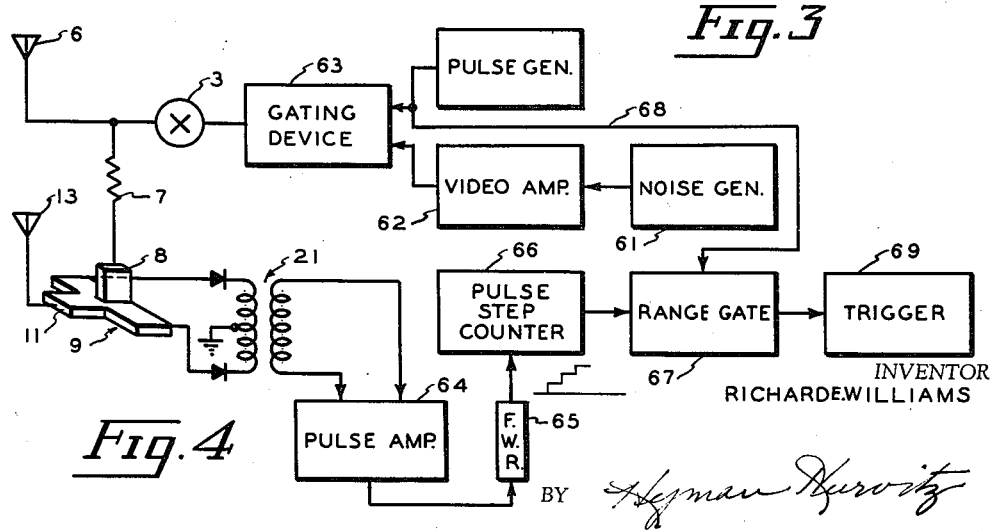
Fig.4
INVENTOR
RICHARD E. WILLIAMS
BY Hyman Hurvitz
ATTORNEY

3,076,191
RADAR SYSTEM
Richard E. Williams, Fairfax, Va., assignor, by mesne assignments, to Melpar, Inc., Falls Church, Va., a corporation of Delaware
Filed Mar. 29, 1955, Ser. No. 497,607
14 Claims. (Cl. 343—14)

The present invention relates generally to target proximity sensing devices, and more particularly to target proximity sensing devices having a predetermined maximum target range beyond which the devices are inoperative.

Briefly describing the present invention, video pulses of radio frequency wave energy are transmitted from the transmitter of a proximity device to a target, which reflects a portion of the transmitted energy to the receiver of the proximity device as echo pulses. Replicas of the transmitted R.F. wave energy pulses are applied to a phase detector, which is incapable of generating video response to such wave energy pulses alone. Received echo pulses are also applied to the phase detector, in such relation that of themselves they produce no video response. In response to overlapping of transmitted and received echo pulses, however, the phase detector provides output video pulses, which may be utilized to fire a squib, and accordingly to detonate an explosive projectile, or to actuate an indicator, or otherwise to effect a control function. The invention is described, for example only, as applied to a proximity fuze.

The effective range of a proximity fuse arranged in accordance with the present invention is that range for which an echo pulse returns to the fuse during a transmitted pulse, i.e. one-half a pulse length in one-way transit time. Targets at a greater range are incapable of firing the fuse, except for targets which are sufficiently remote that an echo pulse generated in response to a first transmitted pulse overlaps in time a subsequent transmitted pulse, i.e. cases in which the echo is generated in response to a non-coincident transmitted pulse. To avoid the latter possibility the radio frequency of the transmitted pulses may be varied, following each transmission, sufficiently so that only overlap of an echo with its transmitted causation pulse is capable of producing a detectable video response in the output of the phase detector circuit.

In order to render the fuse proof against countermeasures, and particularly against jamming by continuous transmissions at the carrier frequencies of pulse transmissions, provision is made for varying the carrier frequencies of successive pulses to randomly selected values. This expedient not only renders the generation of a jamming signal of suitable frequency difficult, but renders the detection of fuse frequencies difficult and uncertain.

In accordance with a first embodiment of the present invention there is provided a transmitter, pulsed at video frequencies, for supplying pulsed R.F. carrier energy to a transmitting antenna. Pulsed R.F. energy from the transmitter is also supplied through an attenuator to the E-plane insertion arm of a conventional Magic-Tee. The Magic-Tee is additionally provided with an H-plane insertion arm, and two H-plane output arms. Each of the H-plane output arms is coupled to corresponding electrodes of a different rectifier. An output video transformer having a center-tapped primary winding is connected in push-pull relation to the remaining electrodes of the rectifiers, the secondary winding of the transformer being employed as the input circuit of an electronic squib firing circuit.

It is a well known property of a Magic-Tee (see U.S. Patent #2,593,120 to Robert H. Dicke) that R.F. signals fed to the E-plane insertion arm emerge from the H-plane output arms in opposite R.F. phase. When the transmitter is pulsed, and assuming no echo signal, signals appear in opposite R.F. phase at the rectifiers, which conduct in alternation at radio frequency in response to the signals, and form identical video pulses in the primary winding halves of the video output transformer, so that no net output voltage is supplied by the output transformer in response to signal derived from the transmitter only.

A portion of each R.F. wave pulse energy emitted by the transmitter antenna may be reflected from a remote target to a receiving antenna, which is coupled with the H-plane insertion arm of the Magic-Tee. The wave energy is divided equally between the two output H-plane arms, emerging from these arms as signals of equal phase. In the absence of a simultaneous transmitted pulse the unilateral conducting devices conduct equally and simultaneously in response to the signals of equal phase, thus cancelling in the balanced transformer and generating no output signal in the transformer secondary. In summary, neither a transmitted pulse alone, nor a received pulse alone generates video output signals, and the system is unresponsive.

Should wave energy reflected from a target be received during a transmitted pulse interval, the rectifiers are simultaneously each subjected to two R.F. waves. One of these waves is applied in the same phase relation to both rectifiers, while the other wave is applied in opposite phase to the separate rectifiers. The relative responses of the rectifiers depends then on the vector sum of the superposed waves applied to each. In general one of the rectifiers conducts more heavily than the other, the balance of video pulse outputs in the output transformer is upset, and a resultant video pulse is generated. The output of the phase detector is a function of the relative phases of the two input signals, which in turn is a function of range of target and of the frequency of the wave energy utilized. Since, in general, range of target is continuously varying, the amplitude of output of the phase detector may have any instantaneous value, from zero to a maximum. In the course of variation of output amplitude a value is reached which is adequate to effect detonation of a squib.

The possibility of simultaneous receipt of transmitted and reflected pulses is determined by the width of the transmitted pulse and the range of the fuze from a target, each pulse width corresponding with a specific operational detonation range. The provision of a clearly defined detonation range is particularly important in distinguishing between two objects which the projectile may be approaching, and only one of which is a desired target. Thus, if a projectile is fired at a low flying aircraft, for example, and approaches the aircraft from above, it is imperative to distinguish between echoes from the craft and from the ground, especially since the latter are of greater amplitude. In the present invention, reflections from the aircraft are inherently received in superposition to transmitted pulses, before pulses reflected from the ground are so received. There is, accordingly, no possibility of detonation of the projectile by ground reflected energy in the presence of desired-target reflected energy.

It is, accordingly, an object of the present invention to provide a target proximity sensing device, wherein wave energy is transmitted toward a target in pulses, and in which the device is energized in response only to reflected waves received concurrently with a transmitted pulse.

Still another object of the present invention is to provide a target proximity sensing device employing a pulsed R.F. transmitter, wherein the detonation range of the device is determined by the width of the transmitter pulses.

Another object of the present invention is to provide a target sensing proximity device employing a pulsed transmitter normally quiescent during a large percentage of total time, wherein the device is non-responsive to reflected or spurious jamming signals during the quiescent period of the transmitter.

It is yet another object of the present invention to provide a target proximity sensing fuze employing a phase detector to actuate a detonator of an explosive projectile.

Still another object of the present invention is to provide a target proximity sensing fuze employing a pulse transmitter, wherein a phase detector is employed to respond to simultaneous application of transmitted and reflected energy to the phase detector for actuating a detonator of an explosive missile.

In a simplified embodiment of the present invention, the R.F. carrier frequency of successive pulses is the same, and the possibility exists that an enemy might analyze the carrier frequency, and generate a continuous jamming signal at the carrier frequency to detonate the fuze prematurely. In a second embodiment of the invention, the carrier frequency is varied considerably and at random between successive pulses. Random variation of the frequency of successive transmitted pulses greatly reduces the possibility of jamming the fuze of the present invention, since it is highly unlikely that the carrier frequency could be analyzed and a jamming signal of suitable frequency transmitted during the relatively short transmitter pulse period. Continuous wave jamming is also rendered difficult since signals at frequencies different from the carrier frequency by only a small percentage of the carrier frequency produce beat frequencies outside of the band pass characteristics of the video output transformer.

The circuit for randomly varying the carrier frequency of successive transmitted pulses may include a noise generator which varies the voltage applied to a frequency determining element of the transmitter, to effect complete randomness of frequency variation.

In a further modification of the last described embodiment of the present invention, a device is provided which requires that a plurality of successive pulses be applied to the detonating circuits of the invention, to effect detonation. Since the frequency of operation is continuously varying at random, a single or a randomly selected combination of jamming signals is extremely unlikely to effect detonation.

It is, accordingly, another object of the present invention to provide a target proximity sensing device employing a pulsed transmitter, wherein the carrier frequency of the transmitter differs considerably in successive pulses.

It is another object of the present invention to provide a target sensing proximity device employing a pulsed transmitter and a phase detector circuit for developing an output signal upon the simultaneous application of transmitted and reflected energy to the phase detector, wherein the carrier frequency of the transmitted signal is varied considerably between successive pulses.

Another object of the present invention resides in the provision of a target proximity detection device, wherein successive wave energy pulses are transmitted at randomly selected frequencies, and where a plurality of successive echo pulses each of suitable frequency is required to arrive from a target located within a predetermined range in order to effect a control function, whereby the probability of jamming by a plurality of randomly selected continuous wave energy signals is minimized.

The above and still further features, objects, and advantages of the present invention will become apparent upon consideration of the following detailed description of a specific embodiment of the invention, especially when taken in conjunction with the accompanying drawings, wherein:

FIGURE 1 is a block and schematic circuit diagram of a first embodiment of the present invention;

FIGURE 2 is a schematic circuit diagram of a relatively low frequency phase detector circuit analogous in operation to the ultra-high frequency phase detector circuit of FIGURE 1;

FIGURE 3 is a schematic circuit diagram of a pulse transmitter of random frequency pulses, utilizable in the system of FIGURE 1; and FIGURE 4 is a block diagram of an embodiment of the invention, which requires that a plurality of successive echo pulses of suitable randomly selected frequencies be received, to effect a control function.

Referring now more specifically to FIGURE 1 of the accompanying drawings, a pulse generator 1 generates successive spaced video pulses, which are applied over lead 2 to an oscillator 3. The latter may be a klystron oscillator, for example, operating at U.H.F. frequencies. The oscillator 3 is rendered active in response to each applied pulse, being quiescent in the intervals between pulses.

The U.H.F. output pulses supplied by oscillator 3 are applied over line 4, to a transmitting antenna 6. The output pulses supplied by oscillator 3 are also applied through a suitable attenuator 7 to an E-plane insertion arm 8 of a Magic-Tee 9. An H-plane insertion arm 11 of the Magic-Tee 9 is coupled over line 12 to a receiving antenna 13. H-plane output arms 14, 17, of the Magic-Tee 9 are coupled, respectively, to the cathodes of rectifiers 16, 18. The anodes of the rectifiers 16 and 18, respectively, are connected to opposite ends of a center-tapped primary winding 19 of an output video transformer 21, having a secondary winding 22. Obviously, the anode and cathode connections of rectifiers 16 and 18 may be interchanged and it is not intended to limit the invention to the specified connections illustrated.

A first terminal 24 of the secondary winding 22 is connected to a control grid of a thyratron 26 while a second terminal 27 of the secondary winding 22 is connected to a control grid of a thyratron 28. The secondary winding 22 is provided with a center tap 29 which is connected through a bias supply 31 to the cathodes of thyratrons 26 and 28. The plates of the thyratrons 26 and 28 are connected together and to one terminal of a squib 32. The other terminal of the squib 32 is connected through a resistor 33 to a source of plate voltage supply 34. A capacitor 36 is shunted across the series connected resistor 33 and plate voltage source 34.

The capacitor 36 is charged from the plate source 34 through the resistor 33 during the period when neither of the thyratrons 26 and 38 is conductive. When a positive pulse of sufficient duration and amplitude is applied to the control grid of either of the thyratrons 26 and 28, that thyratron is rendered conductive and the capacitor 36 discharges through the squib 32 and the thyratron in series, firing the squib and detonating the projectile.

The voltage pulses required for controlling firing of the thyratrons 26 and 28 are generated in response to the simultaneous application of transmitted energy and received wave energy to a phase detector circuit comprising the Magic-Tee 9, the rectifiers 16, 18, and the video transformer 21.

Transmitted energy from the oscillator 3 is applied through the attenuator 7 to the E-plane insertion arm 8. The energy applied to the arm 8 divides equally between the equal H-plane output arms 14 and 17, and thence are applied at the cathodes of the rectifiers 16 and 18, in opposite phase.

Referring to FIGURE 2 of the accompanying drawings, which is an equivalent circuit diagram of the phase detector of FIGURE 1, a transformer 37, which is equivalent the E-plane arm 8 in FIGURE 1, has a secondary winding 39 connected between the cathodes of the unilateral devices 16 and 18. An A.-C. voltage applied to a primary winding 38 of the transformer 37 is applied through the secondary winding 39 to the cathodes of the unilateral devices 16 and 18 in opposite phase, so that no net video response is apparent in primary winding 19.

Comparing the circuitry of FIGURE 1 with that of FIGURE 2, insertion of a signal at H-plane insertion arm 11, in FIGURE 1, is equivalent to insertion of that signal into a secondary winding 41, connected between the center tap 23 on winding 19 and a center tap on secondary winding 39 of transformer 37. The insertion of signals into winding 41 may be accomplished via a coupled winding 42, the winding 41, 42 together constituting an R.F. input transformer 43.

Referring again to FIGURE 1 of the accompanying drawings, a portion of the energy radiated from the antenna 6 may be reflected from a target to the receiving antenna 13. Energy received by the antenna 13 is applied to the H-plane insertion arm 11 of the Magic-Tee 9 and appears at the output terminals of the H-plane output arms 14 and 17, and, therefore at the cathodes of the unilateral devices 16 and 18, in the same phase.

Referring to FIGURE 2, an R.F. voltage applied to the primary winding 42 of the transformer 43 appears at the ends of the secondary winding 39 of transformer 27 co-phasally, and, therefore, appears at the cathodes of the unilateral devices 16 and 18, in the same phase. The unilateral devices 16 and 18 are rendered conductive simultaneously on alternate half cycles of the R.F. voltage, and, accordingly, provide identical signals in the video transformer 21, which cancel out. Thus the application of energy from the antenna 13, only, to the phase detector circuit does not cause an output voltage to be developed in the video transformer 21.

Upon the simultaneous application of signals from the oscillator 3 and the antenna 13 to the phase detector circuit, i.e., during such time interval as the transmitted and reflected signals overlap, the reflected signals may be (in the extreme case) in phase with the transmitted signals applied to one of the unilateral devices 16 and 18, and may be out of phase with the transmitted signals applied to the other of the unilateral devices 16 and 18. The rectifier at which the signals are in phase is conductive on alternate half cycles of the R.F. wave, while the rectifier 16 or 18 at which the signals are out of phase is maintained non-conductive. As a result, a net unidirectional video pulse is developed in the primary winding 19 of the video transformer 21, and is applied through secondary winding 22 to the thyratrons 26 and 28. It is possible that initially the reflected signals are 90° out of phase with the output voltage from the oscillator 3. In such case the rectifiers 16 and 18 are rendered equally conductive on alternate half cycles, and their outputs cancel in the video transformer 21. By reason of the relative motion between the projectile and the target, however, the 90° condition is transient, and changes in a short time to a condition in which the reflected signals are more nearly in phase with the transmitted signals at one or the other of the rectifiers 16 or 18. However, the relative phases of the transmitted and received signals do not, as a practical matter, vary at a frequency greater than the video frequency of the pulsed carrier, and therefore there is ample time for the phase detector to respond to the in-phase condition of the overlapping signals.

The video voltage developed in the primary winding 19 by the phase detector in response to overlapping transmitted and received signals is coupled through the secondary winding 22 to the grids of the thyratrons 26 and 28. The voltage applied to the grids of thyratrons 26 and 28 drives one of the grids more positive and drives the other grid more negative. That thyratron 26 or 28 to which the positive voltage is applied is rendered conductive, and the capacitor 36 discharges through that thyratron, and the squib 32, and fires the squib 32.

The instant at which the transmitted and reflected signals appear simultaneously at the phase detector is a function of the carrier pulse width and the distance of the projectile from a reflecting object or target. Therefore, the distance from a target at which the fuze is actuated, that is, the range of the fuze, is determined by the width of the carrier pulse. Objects outside of the range of the fuze, regardless of their size, shape or other characteristics, cannot produce overlap of transmitted and received signal in the phase detector and thus cannot detonate the projectile.

The phase detector circuit employed in the present invention is to a certain extent frequency discriminatory. Thus, if a signal is applied to the phase detector which has a frequency different from the carrier frequency, at least one beat frequency is established in the phase detector. If the beat frequency lies outside of the pass-band of the video transformer 21, the circuit cannot respond to the beat frequency voltage. By choosing a video transformer 21 with a narrow pass-band, jamming is rendered difficult, requiring an extremely accurate correspondence of fuse and jamming frequencies. Jamming may be rendered even more difficult by maintaining the quiescent period of the oscillator 3 large compared with its active period. Jamming signals received during quiescent intervals of the oscillator 3 are canceled out in the video transformer 21 and accordingly the fuse is impervious to jamming during the greatest percentage of time.

The utilization of quiescent periods that are large compared with active periods of the oscillator also minimizes the possibility that the fuze may respond to echo pulses from a remote target. The desired range of a target proximity detection fuze, arranged in accordance with the present invention is equal to one-half the distance traveled by electro-magnetic waves in a time equal to the duration of one pulse. Nevertheless, the possibility does exist that echo pulses from a remote target, outside the desired range, will return to the receiver of the fuse in overlapping relation to a subsequent transmitted pulse.

Since the interval between transmitted pulses is large compared with the duration of the transmitted pulses, an echo pulse from a remote target exists only for targets at, say, ten times the desired detonation range. Space attenuation reduces the echo power by approximately the fourth power of the distance; a reduction by a factor of ten thousand for the cited example. The triggering threshold, i.e. the thyratron bias, can be set to avoid firing on return of such weak signals.

The possibility of false or undesired fuze firing in response to echo pulses from remote targets may be further obviated by transmitting successive pulses at different frequencies. The difference in frequency of successive pulses may be selected to be greater than the pass-band of the video transformer 21, so that combinational frequencies formed by the rectifiers 16 and 18 do not produce a video signal in the output winding of the transformer 21.

The utilization of a variable carrier frequency also adds greatly to the difficulty of effective countermeasure against fuzes constructed in accordance with the present invention.

Since, as previously noted, the phase detector circuit is frequency discriminating, it is necessary in order to jam the device of the present invention to generate a frequency which closely approximates the frequency of the transmitted pulses. Where the carrier frequency of the transmitted pulse is varied at random from pulse to pulse it is highly unlikely that a jamming signal at the frequency of one transmitted pulse will produce a response in the phase detector when compared with a subsequent transmitted pulse. Therefore, in order to jam the device it is necessary to analyze the carrier frequency of a transmitted pulse and generate a jamming signal of suitable frequency during the relatively short transmitted pulse period. The transmitted pulse period is of such a short duration as to render this expedient practically impossible.

The circuitry for generating a randomly variable carrier frequency is illustrated in FIGURE 3 of the accompanying drawings. There is provided a noise generator 46 employing a gas tube 47 that is maintained conductive by a suitable plate voltage source. Noise voltages developed at the plate of the gas tube 47 are coupled to the input circuit of a noise amplifier 48 through a video band-pass filter comprising a small capacitor 49 and a large resistor 51. The band pass filter limits the highest noise frequencies to those which produce a variation of voltage with time, i.e. $E(t)$, essentially constant over the transmitted pulse interval. For instance with a transmitted pulse width of 0.3 $\mu$sec., the maximum noise frequencies passed by the video band pass filter would be approximately 20 kc. to restrict the frequency drift during a transmitted pulse interval to approximately 3% of the pulse-to-pulse frequency shift.

The output voltage produced by the noise amplifier 48 is applied to a first grid 52 of a gate tube 53. Successive spaced video pulses from the pulse generator 1 are applied over lead 2 to a second grid 54 of the tube 53. The noise voltage applied to the grid 52 is gated through the tube 53 by the video pulses applied to the grid 54, and the amplitude of the noise voltage determines the amplitude of the gated video pulses. The video pulses gated through the tube 53 are applied to a plate 56 of the oscillator 3, and render the oscillator active during the video pulse intervals. Where a klystron or traveling wave oscillator is employed as the oscillator 3 the amplitudes of the video pulses determine the oscillator frequency directly. It is a well known property of a noise generator that the amplitude of its output voltage varies considerably with time in a completely random manner. Since the amplitude of the noise voltage during each video pulse interval determines the frequency of the oscillator 3, the variation in frequency of oscillator 3 is completely random from pulse-to-pulse.

The carrier pulses generated by the oscillator 3 are applied over lead 4 to the antenna 6 and attenuator 7, and the remainder of the circuitry is identical to the circuitry of FIGURE 1.

Although a fuze constructed in accordance with the embodiment of the invention illustrated in FIGURE 3 is highly impervious to jamming in response to a signal at a single frequency, probability of jamming the fuze may be greatly increased by the generation of a plurality of signals each at a different frequency. The possibility exists that the frequency of the oscillator 3 may correspond during one pulse interval with the frequency of one of the jamming signals, in which case the fuze would be detonated. This possibility may be minimized, by utilizing a stepping circuit which requires a plurality of successive output pulses from the transformer 21 to develop a voltage of sufficient amplitude in the stepping circuit to detonate the fuze. To jam a fuze employing such a stepping circuit it is necessary correctly to anticipate the random variations in frequency of a plurality of successively transmitted pulses and to generate a plurality of signals at these frequencies. The probability of correctly anticipating the randomly varying frequencies of successive pulses is practically nil.

Referring now more specifically to FIGURE 4 of the accompanying drawings, the output voltage from a noise generator 61, which may be a gas tube as illustrated in FIGURE 3, a regenerative amplifier or other well known noise generator circuit, is coupled through a video pass band amplifier 62 to a gating device 63. The noise voltage is gated through the gating device 63 by pulses supplied from a pulse generator 1 and is applied to the oscillator 3. The noise voltage pulses render the oscillator 3 active and determine the oscillator frequency, as explained in describing the embodiment of my invention illustrated in FIGURE 3. The output voltage from the oscillator 3 is applied to the transmitting antenna 6, and through attenuator 7 to the E-plane insertion arm 8 of the Magic-Tee 9.

Echo signals are received by the receiving antenna 13 and applied to the H-plane insertion arm 11 of the Magic-Tee 9. Upon the simultaneous appearance of transmitted and echo signals at the arms 8 and 11 of the Magic-Tee 9 a video pulse is developed in the video transformer 21 and is coupled through a video pulse amplifier 64 and a full wave rectifier 65 to a pulse step counter (or integrator) 66. The pulse step counter 66, which may be a stair-step wave generator, an integrator, or other well known stepping circuit, increases the amplitude of its output voltage by a predetermined voltage increment in response to successive applied pulses. The pulse step counter 66 is responsive to signals of one polarity only and since the phase detector circuit may develop pulses of opposite polarities, the full wave rectifier 65 is employed so that only pulses of the correct polarity are applied to the pulse step counter 66. The output voltage from the pulse step counter 66 is applied as a first input to a range gate 67, a second input to the range gate 67 being supplied over lead 68 from the pulse generator 1. The range gate 67 is a coincidence circuit or gate, which produces an output pulse only upon the simultaneous receipt of two input pulses, each of predetermined amplitude. The amplitude of the pulses supplied by the pulse generator 1 remains constant and the generation of an output pulse by the range gate 67 depends upon the output voltage of the pulse step counter 66 being stepped by successive pulses to at least a predetermined amplitude as determined by the circuit constants of the range gate 67. Thus the number of video pulses "$n$" which must be applied to the pulse step counter 66 to raise its output voltage amplitude sufficiently to be gated through the range gate 67, depends upon the incremental increase in the output voltage of the pulse step counter 66 for each pulse applied and upon the gating level of the range gate 67.

The gated output voltage from the range gate 67 is fed to a trigger circuit 69 which may be similar to the thyratron circuit illustrated in FIGURE 1. In this embodiment of the invention, however, since the output voltage from the range gate is always of the same polarity, it is necessary to employ only a single thyratron in the trigger circuit.

The operation of the phase detector circuit illustrated in FIGURE 4 of the accompanying drawings is identical with the operation of the phase detector circuit illustrated in FIGURE 1 of the accompanying drawings. Thus, upon the successive application of simultaneous transmitted and echo pulses to the phase detector circuit successive uni-directional video pulses are developed in the video transformer 21 and are applied through the pulse amplifier 44 and full wave rectifier 45 to the pulse step counter 66. In response to each video pulse the amplitude of the output voltage of the pulse step counter 66 is increased by a predetermined voltage increment. Prior to receipt of the predetermined number of pulses "$n$" required for detonating the fuze, the amplitude of the output voltage of the pulse stepping circuit 66, although increasing with each pulse, is still below the gating level of the range gate 67, the range gate does not develop an output voltage, and the fuze remains quiescent. However, upon the application of the $n$th pulse to the pulse step counter 66 the magnitude of its output voltage rises above the gating level of the range gate 67, a voltage is gated by a pulse from the pulse generator 1 to the trigger circuit 69, and the fuze is detonated.

Since the carrier frequency of successive transmitted pulses varies at random from pulse to pulse, jamming of the fuze is extremely difficult, requiring anticipation of a sufficient number of the random variations of the carrier frequency.

The range gate 67 is not essential to the operation of the embodiment of the invention illustrated in FIGURE 4. For example, the firing level of the thyratron in the trigger circuit 69 may be adjusted to respond only to a predetermined output voltage of the pulse step counter 64 and the extraneous range gate 67 thus eliminated. It has been found in practice, however, that the range gate 67 may be made more stable and reliable than the thyratron circuit, and, therefore, it is preferable to employ the range gate circuit.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What is claimed is:

1. A target proximity sensing device, comprising transmitter means for generating first carrier signals, pulse generating means, means responsive to said pulse generating means for rendering said transmitter means alternately active and quiescent, first means for radiating said carrier signals to a remote target while said transmitter is active and for receiving second carrier signals reflected from said target, and detector means for detecting the simultaneous presence only of the radiated and second carrier signals at said proximity sensing device, and having means for varying the frequency of said transmitter means so that successive first carrier signals have different frequencies.

2. The combination in accordance with claim 1, wherein said means for varying changes the frequency of said transmitter means between successive pulses sufficiently that the beat frequency between successive signal frequencies lies outside of the pass-band of said detector means.

3. In combination, transmitting means for generating carrier signals, pulse generating means, means responsive to said pulse generating means for rendering said transmitting means alternately active and quiescent, antenna means for radiating said carrier signals toward a target, while said transmitter is active and for receiving carrier signals reflected from said target, and video frequency detector means for only indicating the receipt of signals by said antenna means only during an active interval of said transmitter means, said detector means comprising a first and a second input terminal and means for applying one of said carrier signals in opposite phase to said first and second input terminals and for applying the other of said carrier signals in phase to said first and said second input terminals.

4. The combination in accordance with claim 3, wherein said detector means further comprises a video transformer having a primary winding and a secondary winding, a first rectifier means connected in series between one end of said primary winding and said first input terminal, a second rectifier means connected in series between the other end of said primary winding and said second input terminal, said first and second rectifier means being arranged to pass current in the same direction between said input terminals and said primary winding.

5. The combination in accordance with claim 4, wherein said means for applying said carrier signals to said first and said second input terminals comprises a Magic Tee.

6. The combination in accordance with claim 4, having means connected to said secondary winding of said video transformer for initiating a reaction in response to the generation of a voltage in said secondary winding.

7. The combination in accordance with claim 3, having noise voltage generating means for varying the frequency of said transmitting means so that the frequency of said transmitted signals varies randomly from one transmitted signal to the next.

8. In a target proximity detector, means for transmitting a plurality of wave energy pulses toward said target, means for randomly varying the frequency of said wave energy pulses from pulse to pulse, means for receiving echoes of the transmitted wave energy pulses from said target, and means responsive only to simultaneous occurrence of transmitted and received wave energy pulses of substantially identical frequency at said proximity detector for generating a video pulse.

9. The combination in accordance with claim 8, having further means responsive to the generation of a predetermined number of video pulses for actuating said proximity detector.

10. The combination in accordance with claim 9, wherein said last mentioned means comprises a voltage stepping means for increasing the amplitude of its output voltage by a predetermined voltage increment in response to each of said video pulses and gating means for producing an output voltage in response to the output voltage of said voltage stepping means attaining a predetermined amplitude.

11. In a target proximity detector, oscillator means for generating carrier signals, noise generating means for generating a noise voltage having a randomly varying amplitude at video frequencies, gating means for producing video pulses having an amplitude corresponding to the amplitude of said noise during a pulse interval, means responsive to said video pulses for rendering said oscillator means alternately active and quiescent and for determining the frequency of said oscillator means in accordance with the amplitude of said video pulses, means for radiating said carrier signals toward a target, means for receiving echo signals from said target and means responsive only to simultaneous occurrence of transmitted and received signals of substantially identical carrier frequency at said proximity detector for generating a video pulse.

12. In a target sensing detector, oscillator means for generating carrier signals, noise generating means for generating a noise voltage having a randomly varying amplitude at video frequencies, means responsive to said noise voltage for rendering said oscillator means alternately active to quiescent at video frequency and for determining the frequency of said oscillator means in accordance with the amplitude of said noise voltage, means for radiating said carrier signals toward a target, means for receiving echo signals from said target and detector means for detecting the simultaneous presence of said carrier and echo signals at said proximity detector.

13. A target proximity sensing device, comprising transmitter means for generating first carrier signals, pulse generating means, means responsive to said pulse generating means for rendering said transmitter means alternately active and quiescent, first means for radiating said carrier signals to a remote target while said transmitter is active and for receiving second carrier signals reflected from said target, and detector means for detecting the simultaneous presence only of the radiated and second carrier signals at said proximity sensing device, wherein said detector means comprises a phase detector having a video passband, said phase detector comprising a magic tee having one input terminal responsive to said first carrier signals and another input terminal responsive to said second carrier signals, said magic tee deriving as one of its outputs a signal representing the vector sum of said signals applied to its one and another terminals and as another of its outputs a signal representing the vector difference of said signals applied to its one and another terminals, and means for comparing said one and another outputs.

14. In combination, a radio frequency oscillator, means including said radio frequency oscillator for transmitting a pulsed carrier wave having a frequency equal to that of the oscillator, means for receiving said pulsed carrier wave as an echo from a remote target, means responsive to the reception of the echo pulsed carrier wave by said means for receiving concurrently with transmission of the transmitted carrier wave for effecting a control function, said last named means being a phase detector, said phase detector comprising; a magic teen having a first input terminal responsive to said transmitted carrier wave and another input terminal responsive to said echo carrier wave, said magic tee deriving as one of its outputs a signal representing the vector sum of the waves applied to said first and another input terminals and as another of its outputs a signal representing the vector difference of said waves applied to said first and another input terminals, and means for comparing said one and another outputs.

References Cited in the file of this patent

UNITED STATES PATENTS

| | | |
|---|---|---|
| 2,408,742 | Eaton | Oct. 8, 1946 |
| 2,422,074 | Bond | June 10, 1947 |
| 2,517,549 | Earp | Aug. 8, 1950 |
| 2,691,734 | Beck et al. | Oct. 12, 1954 |
| 3,014,215 | Macdonald | Dec. 19, 1961 |

FOREIGN PATENTS

| | | |
|---|---|---|
| 585,791 | Great Britain | Feb. 25, 1947 |